INVENTOR.
RICHARD E. BRATTON
BY William C. Nealur
ATTORNEY

Oct. 5, 1965 R. E. BRATTON 3,210,450
MACHINE AND METHOD FOR MAKING PERFORATED BRICK
Filed March 10, 1964 3 Sheets-Sheet 2

INVENTOR.
RICHARD E. BRATTON
BY William C. Deaton
ATTORNEY

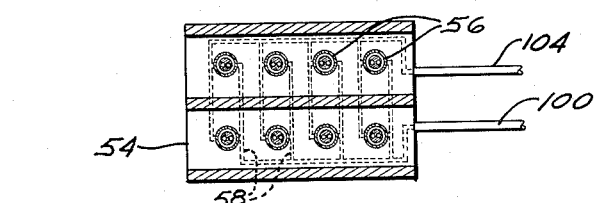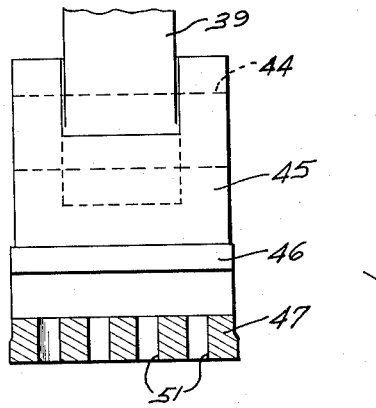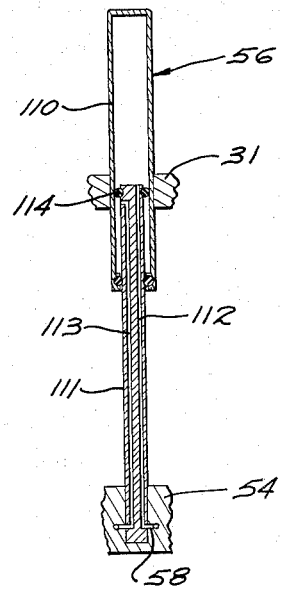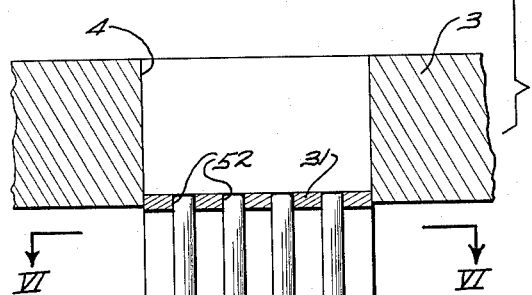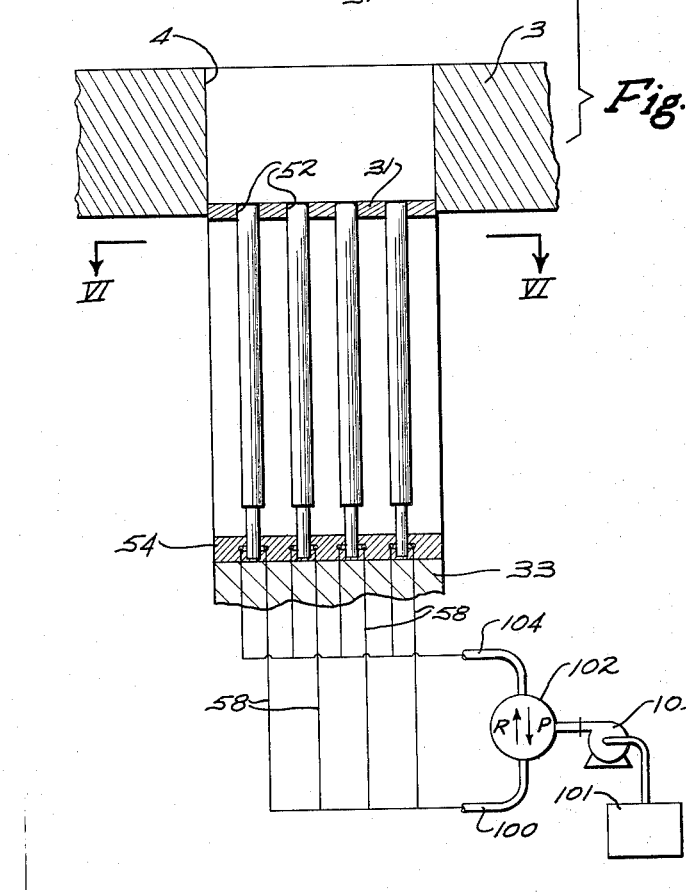

United States Patent Office 3,210,450
Patented Oct. 5, 1965

3,210,450
MACHINE AND METHOD FOR MAKING PERFORATED BRICK
Richard E. Bratton, Fulton, Mo., assignor to Harbison-Walker Refractories Company, Pittsburgh, Pa., a corporation of Pennsylvania
Filed Mar. 10, 1964, Ser. No. 350,878
5 Claims. (Cl. 264—154)

In certain respects, this invention relates to improvements in the invention disclosed and claimed in my copending application, Serial No. 165,565, filed January 11, 1962 (now United States Patent No. 3,127,459), entitled "Machine for Making Perforated Brick," and owned by a common assignee.

This invention relates to an improved brickmaking method and machine of the type used to make perforated brick from granular brickmaking material, which brick are of more uniform density and predictable thermal and heat exchange properties than those previously available. Such brick, in refractory compositions, are commonly used as checker brick in the regenerators of iron blast furnaces and the like.

As pointed out in said copending application, one should first comprehend that the forming of holed brick from free-flowing granular materials presents problems of a distressing character, which are not commonly encountered in forming such products from plastic deformable clay-type masses or blanks. In the latter type of manufacture, a preformed blank or "clot," usually formed by extrusion, is fed to a press (often termed a "runner brick press") where it may be reshaped readily and provided with holes by forcing plungers or pins through the preformed plastic mass while ejecting the plastic material displaced by the pins. An example of a press, which performs according to this operating technique, is disclosed in the United States patent to Miller et al., entitled "Power Press for Perforated Articles," Serial No. 2,254,107. These runner brick-type presses do not preform satisfactorily with the semi-dry granular materials used in so-called power pressing or dry pressing. If preformed, as by the pressing of blanks, the granular pressed units are brittle and nonyielding, and any attempt to reshape them by piercing would inevitably lead to fracturing or shattering them. The granular pressed ware, with which my invention is particularly concerned, is formed at pressures ranging from about 1000 to about 15,000 p.s.i.

Although granular power pressing is the most commonly used method of making refractory brick, such brick usually have been simple plain-faced shapes without holes. A pressing method which has been tried to some extent, but with great limitations (which my previous invention, as disclosed and claimed in said application, Serial No. 165,565, overcomes) has been providing a mold chamber containing vertical pins over which granular batch material is charged before pressing. An example of such apparatus is found, for example, in the patent to Armstrong, entitled "Apparatus for Molding Pierced and Indented Dry Brick," No. 1,965,758. Prohibitive brick breakage, arising from such a method, is due to the extreme difficulty of uniformly charging granular material to so irregular a mold as one having fixed spaced vertical pins.

My copending application, Serial No. 165,565, conceived of means for first charging a mold of uncomplicated design, and then moving the hole-forming pins into position before compaction of the granular material. This has been an eminently satisfactory system. However, when one wishes to make larger or thicker shapes, certain difficulties have been observed. For example, using the arrangement of my copending application, above identified, brick upwards of 5″ but preferably no more than about 4½″ have been made. For some installations, it is desirable to have apertured checker-type brick on the order of 7½″ in thickness. The arrangement of my copending application is not as satisfactory as might be desired in making such thick brick. For example, as is well known, initial compaction of the granular mass in a brick press mold cavity is nonuniform, as is the densification. For example, densification starts near the top of the material. With this nonuniform initial densification, there is considerable friction generated between particles and over adjacent cavity and pin walls. Pin wear is quite extensive, and they must be replaced more often than one would desire. Also, on some occasions, it has been found the degree of friction is such as to prevent eventual equalization of densification of the brick. The present invention overcomes such problems, and is particularly successful in fabricating thicker checker brick. When I refer to "thickness" and discuss "thicker" or "thick" brick, I intend to discuss the vertical heighth of a compressed brick measuring from the top to the bottom in a mold cavity.

It is, thus, among the objects of this invention to provide method and apparatus for forming apertured refractory brick from granular material, which assures performance of the operation rapidly, and requires only minor modification of conventional brick presses. It is a further object of the invention to provide method and apparatus for fabrication of relatively thick apertured checker brick on a conventional brick press utilizing conventional granular brickmaking materials.

In accordance with this invention, the brickmaking machine has a table provided with a mold cavity which is open at its top and its bottom. A vertically-movable pressure plate normally closes the bottom of the cavity and is provided with a plurality of vertical openings or holes of substantially the same size that the brick is to have. Normally disposed above the cavity is a vertically-movable top pressure plate, also provided with a plurality of holes or apertures which are aligned with and of substantially the same size as those in the bottom plate.

A number of extensible and retractable pins are normally disposed below the bottom pressure plate holes with their upper ends substantially flush with the upper surface of the bottom pressure plate. The other ends of the pins are rigidly secured to support structure which is, in turn, connected to brick press support structure. The usual means are provided for filling the molding cavity with granular brickmaking material. Means are also provided for extending the pins through the bottom pressure plate and the mold cavity thereabove until their upper ends are substantially flush with the top of the table in order to form passages through the material previously deposited in the mold. When the top pressure plate is moved down into the mold cavity about the extended pins, the material is pressed to form a brick. During initial compression, of the granular brickmaking material (i.e., the first few seconds or so), at which time only the upper volume of the brickmaking material has become densified, this densified material can frictionally engage the upper ends of the pins. This frictional engagement can be sufficient to move the pins downwardly a short distance, for example, on the order of ½″ or so. This movement can be eliminated by using very high hydraulic pressures. In a preferred embodiment, the pins are hydraulic cylinders supplied from a common oil reservoir. A double acting hydraulic control valve is included in either the main discharge from the reservoir, or separate ones are placed in each of the lines interconnected to the respective plurality of pins. In operation, a conventional two-way pump forces hydraulic liquid into the cylinders to lift their upper portions, which serve as the pins, to a position ready for compression. The upper pressure pad moves downwardly, thus densifying the upper portion of the granular material in the cavity at which time there can be frictional engagement between this material and the pins.

After the top pressure plate has completed its downward compressive movement to uniformly densify the granular material in the cavity, the top and bottom pressure plates move upwardly with the pins to lift a completed apertured brick to the top of the mold cavity level with the machine table. The raised brick is moved to one side of the mold cavity. The upper plate, of course, moves away from one brick. Almost the instant the brick leaves the cavity and the upper plate leaves the surface of the brick, it expands from the pins. They substantially simultaneously drop to their lowermost positions.

A preferred embodiment of the invention is illustrated in the accompanying drawings, in which:

FIG. 1 is a side view of a brickmaking machine according to this invention partly broken away in central vertical section and with some parts omitted and indicated in dashed lines to better show cooperation between parts;

FIGS. 2, 3, and 4 are enlarged fragmentary vertical sections showing different steps in the process of operation of the machine of FIG. 1, with some parts omitted, broken away or sectioned to better emphasize cooperation between parts;

FIG. 5 is a further enlarged fragmentary vertical section taken on the line V—V of FIG. 1, showing the mold cavity empty;

FIG. 6 is a horizontal section taken along the line VI—VI of FIG. 5; and

FIG. 7 is an enlarged fragmentary sectional detail of one of the extensible and retractable pins in relation to some associated parts of the apparatus of FIG. 1 through 6.

Figure 1:
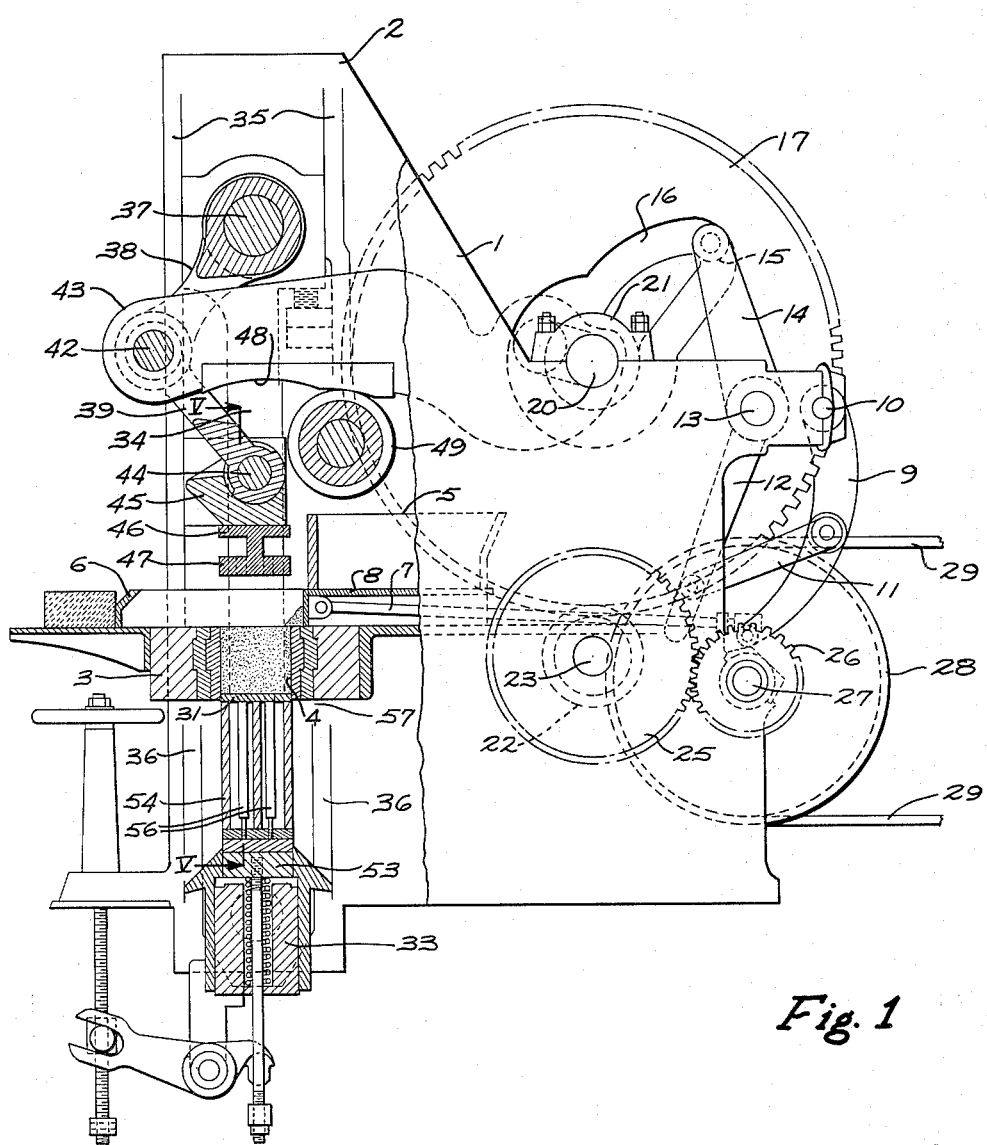

A brickmaking machine according to this invention may be made by modifying a portion of such as the well-known Boyd-type brick press as shown, for example, in United States Patent No. 987,124. As shown in the drawings herein, the machine has a pair of laterally spaced side frames 1 and 2 between the lower and front part of which a table 3 is rigidly mounted. The table is provided with a rectangular molding cavity 4, which extends completely through it. At the back part of the table, there is a hopper 5 that contains the granular material to be used in making brick. The lower end of the hopper is spaced from the table by a charging box 6 which is arranged to slide backwards and forwards across the molding cavity, by means of a rod 7 which is pivotally attached to the rear of the box below its extension 8 and to an arm 9 suspended from a pivot 10 which is mounted across the side frames 1 and 2. The arm 9 is swung back and forth by a link 11 that is pivotally connected to it and to the lower end of an arm 12 which straddles rod 7. The upper end of arm 12 is rigidly mounted on a horizontal rock shaft 13 journaled in the side frames of the machine. The lower end of another arm 14 is rigidly mounted on a projecting end of the rock shaft, and the upper end of this latter arm carries a cam follower roller 15 which travels in the groove of a cam 16 which is mounted on the inner side of a large gear 17. This latter gear is rigidly mounted on a projecting end of a crankshaft 20, the ends of which are, in turn, mounted on bearings 21 carried by the respective side frames 1 and 2. The gear is driven by a pinion 22 on one end of a shaft 23 below it. This shaft 23, likewise, is journaled across the side frames and its opposite end carries a gear 25 which is driven by a pinion 26 mounted on a shaft 27 behind it. This rear shaft, also, is journaled in the side frames from one of which it projects and carries a pulley 28 which is driven by a belt 29 which is, in turn, interconnected with and driven by an electric motor (not shown in the drawings).

When the charging box 6, filled with granular material, is moved across the mold cavity, the material falls into the cavity and fills it, as shown in FIG. 1. The material is retained in the cavity by the bottom pressure plate 31, which is supported in the bottom of the cavity by the stool 54 supported by the lower press saddle plate 53 on crosshead 33. The latter is supported at it opposite ends by vertical side bars 34, which have enlarged ends guided through their vertical movements between ribs 35 and 36 on the side frames of the machine. The bars can be moved, vertically, far enough to lift the bottom pressure plate to a level flush with the top of the table.

Journaled in the upper ends of the two side bars is a horizontal shaft 37, on which the upper end of a heavy toggle link 38 is pivotally disposed. The lower end of this link 38 is provided with a central recess, in which the upper end of a lower toggle link 38 is disposed. The adjoining ends of these links are connected by a horizontal shaft 42 on the central portion of which the front end of a crank arm 43 is pivotally mounted. The lower end of the lower toggle link carries a shaft 44, the ends of which are mounted in a crosshead 45 that slides up and down the same side frames 1 and 2. This crosshead, in turn, carries a plunger 46, which supports a top pressure plate 47 aligned with a mold cavity 4.

The rear end of crank arm 43 is journaled on the offset center of crankshaft 20. As the large gear is rotated, the toggle is straightened and broken by the crank arm, the bottom of which has cam surfaces 48 that move back and forth across a cam roller 49 which is journaled across the same machine side frames 1 and 2. The action of the press is such that, while the bottom pressure plate 31 is at the bottom of molding cavity 4, the top pressure plate 47 can be raised high enough to permit the charging box 6 to move forward and back beneath it, after which the toggle is straightened out to move the top pressure plate down into the molding cavity to mold a brick. Then the side arms 34 are raised to lift the brick to the top of the cavity, while the toggle and crank arm move the top pressure plate upward, away from the brick, so that the charging box can again move forward and push the brick forward onto the table in front of the mold cavity.

As is discussed elsewhere, it is a feature of this invention that, during the molding operation, vertical holes or passages are formed in the brick to reduce its weight and improve its thermal properties. Accordingly, as best shown in FIG. 5, the top and bottom pressure plates are provided with a plurality of aligned vertical holes 51 and 52, respectively, which, in size and number, are the same as the holes to be formed in a brick. Fluid, under pressure, is delivered to the lower end portions of the pins 56 through the plurality of lines 58 which, through a common conduit 100, communicate with a reservoir 101. A two way double acting valve 102 is positioned in the conduit 100. A pump 103 is arranged to deliver hydraulic fluid or oil from the reservoir 101 through conduit 100 to the pins 56 and to later allow or cause return flow of the fluid from the pins to the reservoir when pressure is exerted through line 104.

Figure 2:
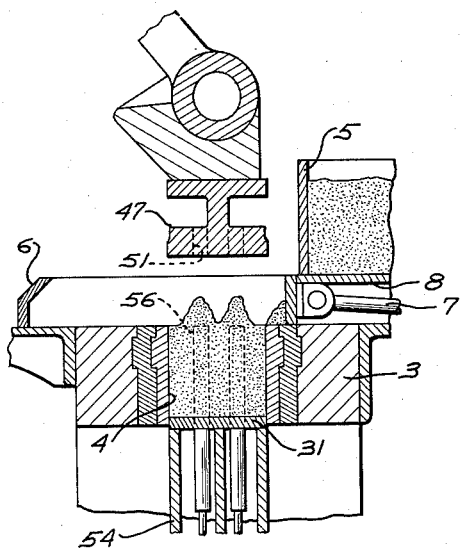

As noted above, in their retracted or lower position, the pins have their upper ends near the upper surface of the bottom pressure plate 31, substantially as shown in FIG. 5. In the upper position, the upper ends of the pins are substantially flush with the top of the table, as shown in FIG. 2.

Figure 3:
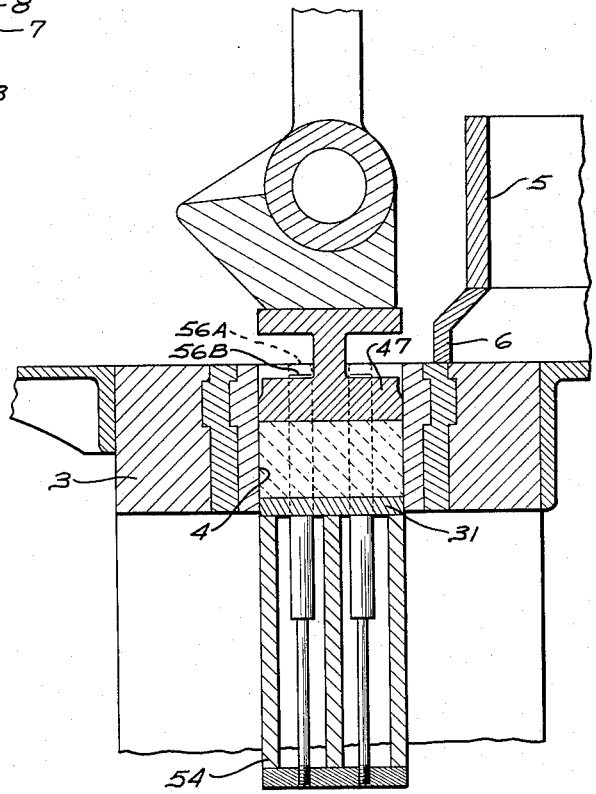
Figure 4:
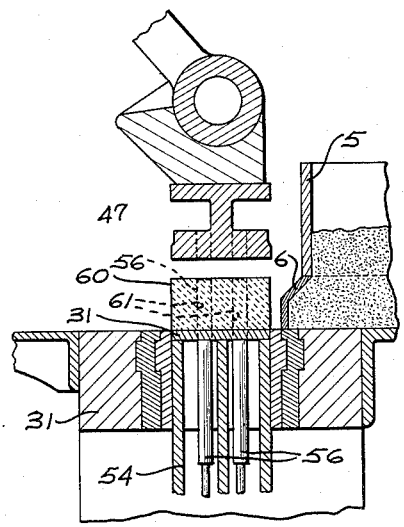

The operation of the press is as follows: With the bottom pressure plate 31 in the bottom of the molding cavity, and the pins 56 in their most retracted position so the tops of the pins will, likewise, be at the bottom of the cavity (see FIG. 1 or FIG. 5). The charging box 6 moves forward to fill the cavity with the granular brickmaking material; but, before the charger is retracted, the pump 103 is actuated to cause extension of the pins 56 through the lower pressure plate 31 and, also, through the loose granular material in the mold cavity to form vertical passages therethrough, as shown in FIG. 2. Then, as the charging box moves back to position beneath the hopper 5, it will carry with it the granular material pushed up by the mold by the pins and level off the upper surface of the material remaining in the mold cavity. The top pressure plate 47 then descends into the molding cavity to press the material therein into the form of a brick 60, having a predetermined thickness, as shown in FIG. 3. As the plate 27 moves downward about the tops of the raised pins to compress the granular material in the cavity, there is initial densification of an upper layer or volume of the granular material, frictional engagement of the pins, and slight downward movement of the tops of the pins occur, for example, as shown in FIG. 3, from position 56A to position 56B. Following the pressing operation, the bottom pressure plate, the top pressure plate and the pins are raised together to lift the brick from the mold (FIG. 4). As noted, as soon as the brick leaves the cavity, the pins drop. After the top plate has moved upward, away from the brick, the charging box moves forward to push the brick onto the front part of the table. The brick, of course, contains a plurality of holes 61 formed through it by the pins.

One difference between the structure and operation of the apparatus of my copending application, Serial No. 165,565, and the structure of the present case is that the movable pins 56 are self-actuating or, at least, are actuated by means separate from the interconnected mechanical parts of the brick press. The pins, in their most extended position, do pass through the top pressure plate as it descends, and remain there until a formed brick is completely out of the mold box. The pins have a semi-floating action when under the extreme pressing cycle, and, therefore, move downward slightly within the holes of the top pressure plate 47 during the pressing cycle.

As I have noted, high pressure can prevent substantially any pin movement. However, I prefer to use a low enough hydraulic pressure to allow some downward movement, i.e., on the order of an inch. This is done, for example, using a 1.75 I.D. cylinder at 450 p.s.i. 787.5 p.s.i. is the upward thrust of the cylinder. With a press at 800 p.s.i. in the first few seconds of compression, it overcomes the thrust of the cylinder and it moves down somewhat.

FIG. 7 is schematically indicative of a preferred pin structure. The pins 56 are hydraulic cylinders. They include an upper movable shell portion 110 and a lower fixed portion 111. Two conduits pass upwardly through the lower portion 111. A first passage 112 opens into the upper cylinder 110. The second passage 113 opens to an area below the O ring 114 which seals the passage 112 from the passage 113, and above a lower O ring 115 which prevents escape of oil when the cylinder 110 is being lowered. Preferably, a lower portion of cylinder section 111 is threaded for insertion in complementary threads in the support 53 (threading not shown).

While illustrating my invention in connection with a toggle-actuated Boyd press, it is readily applicable to other presses, whether of mechanical or hydraulic type, It, also, is applicable to vibration methods of forming. With this invention, perforated brick can be produced by a brick machine at substantially the same rate as unperforated brick. Also, the changes which are necessary in the machine for that purpose are relatively simple and inexpensive. Further, the invention is applicable to one pin arrangements.

The granular batches used in forming brick by power pressing are, by no means, fine powders. This class of ware, instead, utilizes a graded mixture of particle sizes from as coarse as 4 mesh, down to much finer grains. By way of example, a batch made from 70% flint clay and 30% semi-hard or plastic clay will commonly show these grain sizes: 30% passing through 4 mesh and held by 10 mesh, 20% passing through 10 mesh and held by 20 mesh, 15% passing through 28 mesh and held by 65 mesh, and 35% passing through 65 mesh; the screens referred to being of the standard Tyler series. The industry practices wide latitude in this matter; but, for the class of ware described, there would always be some material held on a 14 mesh screen. This distinguishes from the quite unrelated art of making such small pressed shapes as electrical porcelain, which would contain no material coarser than 14 mesh nor, generally, any particles coarser than even 65 mesh screen. These matters are critical in mold charging problems, since the very fine powders tend to flow like water and, therefore, present only minimum difficulties.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A machine for making perforated brick, comprising a table provided with a brickmaking mold open at its top and at its bottom, a vertically movable bottom pressure plate normally positioned at the bottom of said mold to close it off to maintain brickmaking material there, and at least one vertical hole formed through the bottom pressure plate, a vertically movable top pressure plate normally disposed above the mold and arranged to move downwardly into said mold, at least one hole aligned with said bottom plate hole formed through said top pressure plate, vertical means arranged for independently extensible and rectractable coordinated movement, tops of the vertical means slidably disposed in said plate hole and normally having its upper ends near the upper surface of the bottom plate, first means normally positioned adjacent one side of the mold arranged to slide on the table over the open top of the mold and back again to its starting position to fill the mold with granular brickmaking material and to level the material deposited in the mold after the vertical means has been raised therethrough, second means interconnected with said vertical means for extending it upwardly through both the said bottom plate and the granular material in said mold until its upper end is substantially flush with the top of the table, third means interconnected with the top plate for moving the said top plate down into said mold around the raised vertical means to press granular material into a brick and to lift the top plate after forming the brick, said second means arranged to allow limited retraction of the upper end of the vertical means during initial pressing of the granular means, correlating means to cause the first, second, and third means to operate in the following tandem sequence: the first means to fill the mold, second means to extend the vertical means through the granular material in the mold, the first means to return it to its original position while leveling the material previously deposited in the mold, the third means to move the top pressure plate down into the mold to compress the granular material therein to form a brick, and then to lift the top plate, bottom plate, and vertical means substantially simultaneously to a position to remove a formed brick free from the confines of the mold.

2. A machine according to claim 1 in which the vertical means are separate hydraulic cylinders and the second means includes fluid pressure reservoir arranged to selectively extend and retract the upper portions of the cylinders.

3. In methods of fabricating apertured bodies from unconsolidated granular brickmaking material in which said material is delivered to a brickmaking cavity and a pair of opposed dies are reciprocally movable within the confines of said cavity to compress material deposited therein to make self-sustaining bodies, and in which a plurality of pins are used to make passages through the bodies, and in which the pins are moved through the unconsolidated material deposited in said cavity to push quantities of said unconsolidated material from the cavity to the top thereof to form a plurality of passages therethrough, and the top of the material remaining in the cavity is leveled to evenly distribute unconsolidated material about said pins within the cavity, all prior to compressing said material, the improvement which comprises lowering said pins a limited distance during initial compression of said material, and in which said pins are thereafter raised, substantially simultaneously with said pair of opposed dies while removing a self-sustaining body free from the confines of the cavity.

4. That method of manufacturing apertured refractory checker brick and the like on a brickmaking press, said press including a brickmaking cavity and a pair of opposed upper and lower pressure plates arranged for reciprocal travel within said cavity to compress material therein, which comprises the steps of:

(a) filling a brickmaking cavity in a brickmaking machine with a mass of unconsolidated size graded brickmaking material, said material completely filling said cavity and being supported therein by the lower pressure plate, (b) passing a plurality of substantially parallel pins upwardly through said pressure plate and the unconsolidated brick material in said cavity until the tops of said pins are substantially even with the open top of said cavity, the tops of said pins removing a quantity of material from said cavity in their travel through the cavity, (c) removing from the top of the cavity the material which has been lifted therefrom by said pins in their travel through the material in said cavity, while simultaneously leveling the material remaining in said cavity, (d) substantially simultaneously (I) initiating compression of the material in the cavity by moving the upper pressure plate over an upper portion of the pins, and (II) lowering the tops of the pins a short distance with the upper pressure plate, (e) finishing compressing the material which remains in said cavity about said pins by causing the upper and lower pressure plates to compressively react against each other, (f) causing both the upper and lower pressure plates to slide upwardly with the pins while concurrently removing the compressed material from said cavity, and (g) further lifting the upper plate a sufficient distance as to allow removal of a formed apertured checker brick or the like from the brick press.

5. In methods of fabricating apertured bodies from unconsolidated granular brickmaking material in which said material is delivered to a brickmaking cavity and a pair of opposed dies are reciprocally movable within the confines of said cavity to compress material deposited therein to make self-sustaining bodies, and in which vertical pin means is used to form a least one passage through the bodies, and in which the pin means is moved through the unconsolidated material deposited in said cavity to push quantities of said unconsolidated material from the cavity to the top thereof in forming at least one passage therethrough, and the top of the material remaining in the cavity is leveled to evenly distribute unconsolidated material about said pin means within the cavity all prior to compressing said material, the improvement which comprises lowering said pin means a limited distance during initial compression of said material and in which said pin means is thereafter raised, substantially simultaneously with said pair of opposed dies while removing a self-sustaining body from the confines of the cavity.

References Cited by the Examiner

UNITED STATES PATENTS

| 1,543,068 | 6/25 | Eberling. | |
| 1,965,758 | 7/34 | Armstrong | 25—90 |
| 2,019,937 | 11/35 | Staples | 25—35 |
| 2,209,404 | 7/40 | Lassman | 25—91 |
| 2,254,107 | 8/41 | Miller et al. | 25—90 |
| 2,320,759 | 6/43 | Stacy | 25—91 |
| 3,127,459 | 3/64 | Bratton | 25—90 |

FOREIGN PATENTS

| 2,731 | 2/10 | Great Britain. |

J. SPENCER OVERHOLSER, *Primary Examiner.*

MARCUS U. LYONS, *Examiner.*